(12) United States Patent
Song et al.

(10) Patent No.: US 12,436,698 B2
(45) Date of Patent: Oct. 7, 2025

(54) STORAGE DEVICE FOR MIGRATING DATA STORED IN SUPER MEMORY BLOCK BASED ON PRIORITY AND OPERATING METHOD OF THE STORAGE DEVICE

(71) Applicant: SK hynix Inc., Gyeonggi-do (KR)

(72) Inventors: In Sung Song, Gyeonggi-do (KR); Jin Won Jang, Gyeonggi-do (KR); Byung Min Ha, Gyeonggi-do (KR); Jae Hoon Heo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 10 days.

(21) Appl. No.: 18/355,805

(22) Filed: Jul. 20, 2023

(65) Prior Publication Data

US 2024/0329866 A1    Oct. 3, 2024

(30) Foreign Application Priority Data

Mar. 29, 2023   (KR) .................. 10-2023-0040865

(51) Int. Cl.
*G06F 12/00*   (2006.01)
*G06F 3/06*    (2006.01)

(52) U.S. Cl.
CPC ............ *G06F 3/064* (2013.01); *G06F 3/0604* (2013.01); *G06F 3/0647* (2013.01); *G06F 3/0659* (2013.01); *G06F 3/0673* (2013.01)

(58) Field of Classification Search
CPC ...... G06F 3/064; G06F 3/0604; G06F 3/0647; G06F 3/0659; G06F 3/0673; G06F 3/061; G06F 3/0658; G06F 2212/261; G06F 2212/7202
USPC .......................................................... 711/154
See application file for complete search history.

(56) References Cited

U.S. PATENT DOCUMENTS

| | | | |
|---|---|---|---|
| 2017/0286288 A1* | 10/2017 | Higgins | G06F 12/0246 |
| 2020/0201753 A1* | 6/2020 | Lee | G06F 3/0659 |
| 2022/0113887 A1 | 4/2022 | Walker et al. | |
| 2022/0308755 A1* | 9/2022 | Ng | G06F 12/1027 |
| 2024/0134538 A1* | 4/2024 | Chou | G06F 3/0616 |

FOREIGN PATENT DOCUMENTS

| | | | |
|---|---|---|---|
| KR | 10-2021-0039163 A | 4/2021 | |
| KR | 10-2021-0138996 A | 11/2021 | |

* cited by examiner

*Primary Examiner* — Mardochee Chery
(74) *Attorney, Agent, or Firm* — IP & T GROUP LLP

(57) ABSTRACT

A storage device may set a plurality of super memory blocks each including one or more of the plurality of memory blocks, each including one or more of the plurality of memory units. The storage device may migrate data stored in the first super memory block to a second super memory block among the super memory blocks when a first super memory block among the plurality of super memory blocks satisfies a first condition, and may increase a priority of a target memory unit when the target memory unit among the memory units included in the first super memory block satisfies a second condition.

8 Claims, 14 Drawing Sheets

STORAGE DEVICE FOR MIGRATING DATA STORED IN SUPER MEMORY BLOCK BASED ON PRIORITY AND OPERATING METHOD OF THE STORAGE DEVICE

CROSS-REFERENCE TO RELATED APPLICATION

The present application claims priority under 35 U.S.C. 119(a) to Korean patent application number 10-2023-0040865 filed on Mar. 29, 2023, which is incorporated herein by reference in its entirety.

TECHNICAL FIELD

Embodiments of the present disclosure relate to a storage device for migrating data stored in a super memory block based on a priority and an operating method of the storage device.

BACKGROUND

A storage device is a device for storing data based on a request from an external device such as a computer, a mobile terminal such as a smart phone or tablet, or various electronic devices.

The storage device may further include a controller for controlling memory (e.g., volatile memory/non-volatile memory). The controller may receive a command from an external device, and execute or control operations to read, write, or erase data in the memory included in the storage device based on the input command Moreover, if a read count for a specific area in a memory approaches a preset threshold, a storage device may migrate data stored in the corresponding area to another area in the memory in order to prevent read disturb of the data stored in the corresponding area.

SUMMARY

Embodiments of the present disclosure may provide a storage device and an operating method thereof capable of minimizing the time during which read operations are blocked while migrating data stored in memory.

In addition, embodiments of the present disclosure may provide a storage device and an operating method thereof capable of preventing read performance degradation after data stored in memory is migrated.

In an aspect, embodiments of the present disclosure may provide a storage device including, a memory including a plurality of memory blocks each including one or more memory units, and a controller configured to set a plurality of super memory blocks each including one or more of the plurality of memory blocks, execute, when a first super memory block among the plurality of super memory blocks satisfies a first condition, an operation of migrating data from the first super memory block to a second super memory block among the super memory blocks based on priorities of the memory units included in the first super memory block, and increase the priority of a target memory unit among the memory units included in the first super memory block when the target memory unit satisfies a second condition during the operation of migrating.

In another aspect, embodiments of the present disclosure may provide an operating method of a storage device including, setting a plurality of super memory blocks each including one or more of a plurality of memory blocks each including one or more of a plurality of memory units, determining, as a first super memory block, a super memory block satisfying a first condition among the plurality of super memory blocks, starting an operation of migrating data from the first super memory block to a second super memory block among the plurality of super memory blocks based on priorities of the memory units included in the first super memory block, determining, as a target memory unit, a memory unit satisfying, after the starting, a second condition among the memory units included in the first super memory block, and increasing the priority of the target memory unit.

In another aspect, embodiments of the present disclosure may provide a storage device including, a memory including one or more memory dies each including a plurality of memory blocks, and a controller configured to set a plurality of super memory blocks each including one or more of the plurality of memory blocks, execute, when a first super memory block among the plurality of super memory blocks satisfies a first condition, an operation of migrating data from the first super memory block to a second super memory block among the super memory blocks based on priorities of the memory units included in the first super memory block, and increase the priority of a target memory unit among the memory units included in the first super memory block when the target memory unit satisfies a second condition during the operation of migrating. In this case, the memory blocks included in the first super memory blocks may be distributed over the memory dies.

In another aspect, embodiments of the present disclosure may provide an operating method of a controller including, controlling a memory device to perform an operation of sequentially migrating, to a second super block, data from a first super block in an order of priorities of respective rows of pages within the first super block, and adjusting, when a read count of a selected memory block within the first super block becomes greater than a threshold during the operation, the priority of a selected row of the rows to become highest among the priorities. The selected row may include a page within the selected memory block.

According to the embodiments of the present disclosure, it is possible to minimize the time during which read operations are blocked while migrating data stored in memory, and prevent read performance degradation after migrating data stored in memory.

DETAILED DESCRIPTION

Figure 1:
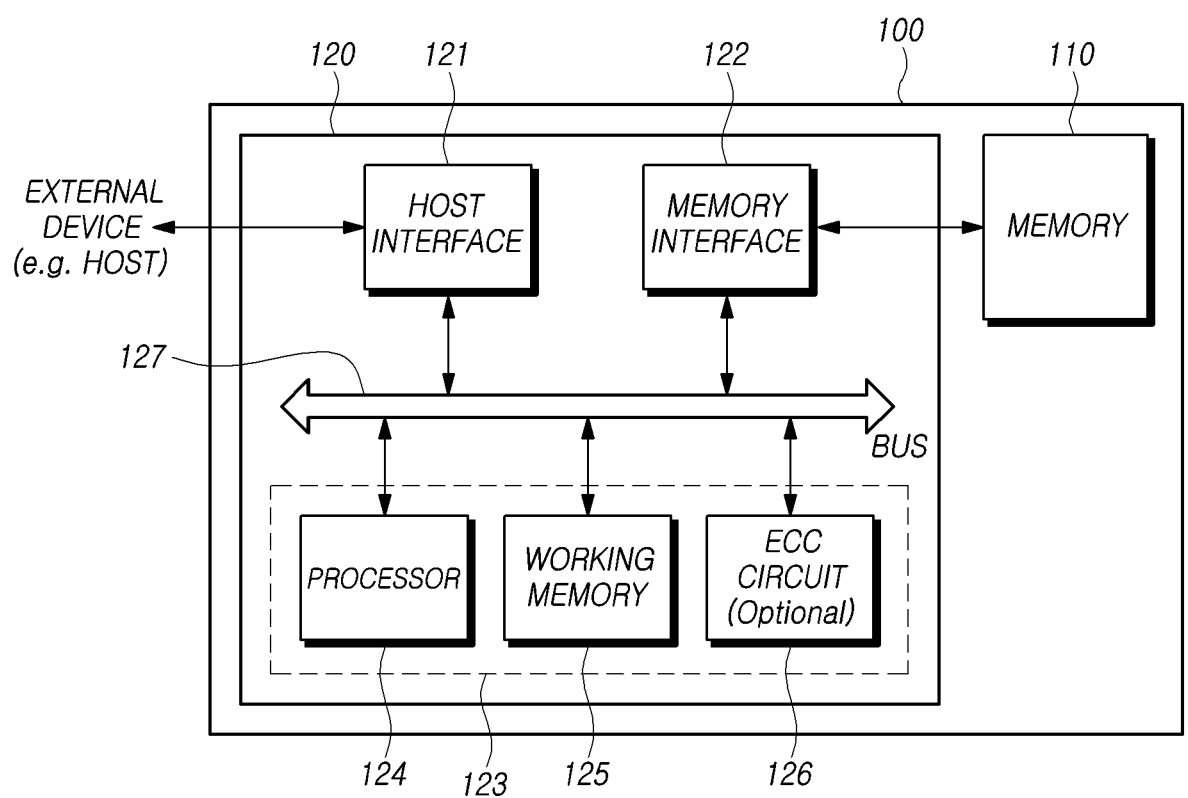
FIG. 1 is a schematic configuration diagram of a storage device according to an embodiment of the present disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout this disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device 100 according to an embodiment of the present disclosure.

Referring to FIG. 1, the storage device 100 may include a memory 110 for storing data and a controller 120 for controlling the memory 110.

The memory 110 includes a plurality of memory blocks, and operates under the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data. Such a memory cell array may exist in a memory block.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the present disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. The memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from an external device (e.g., a host) located outside the storage device 100. The controller 120, however, also may control the operation of the memory 110 regardless or in the absence of a request from the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any of various electronic devices that require the storage device 100 capable of storing data.

The host may include at least one operating system (OS). The operating system may generally manage and control the function and operation of the host, and may provide interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience, descriptions will describe the controller 120 and the host as devices that are separated from each other.

Referring to FIG. 1, the controller 120 may include a memory interface 122, a control circuit 123, and a host interface 121.

The host interface 121 may provide an interface for communication with the host. For example, the host interface 121 provides an interface that uses at least one from among various communication standards or interfaces such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is, the memory interface 122 may provide an interface between the memory 110 and the controller 120 under the control of the control circuit 123.

The control circuit 123 may perform the general control operations of the controller 120 to control the operation of the memory 110. To this end, for instance, the control circuit 123 may include a processor 124, a working memory 125, and an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to an embodiment of the present disclosure will be described as implementing a processor 124 that executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer (FTL), which performs a translating function between a logical address requested to the storage device 100 from the host and a physical address of the memory 110; a host interface layer (HIL), which serves to analyze a command requested to the storage device 100 as a storage device from the host and transfer the command to the flash translation layer (FTL); and a flash interface layer (FIL), which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include, for example, management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store firmware, a program code, a command and data. The working memory 125 may be a volatile memory that includes, for example, at least one of an SRAM (static RAM), a DRAM (dynamic RAM) and an SDRAM (synchronous DRAM).

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate (BER) is higher than a reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in read data last. There may be one or more sectors that are determined to be uncorrectable. The error detection and correction circuit 126 may transfer information (e.g., address information) regarding a sector which is determined to be uncorrectable to the processor 124.

A bus 127 may provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
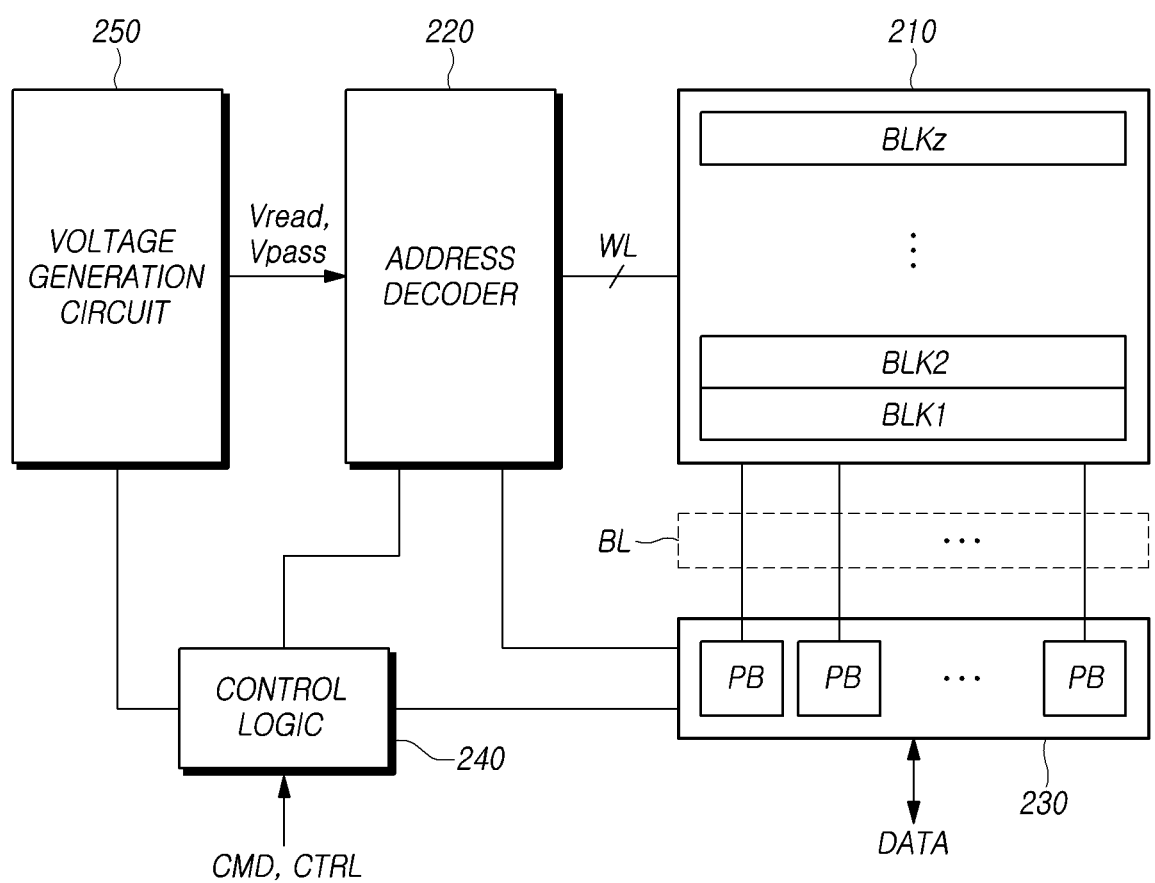
FIG. 2 is a block diagram schematically illustrating a memory of FIG. 1.

FIG. 2 is a block diagram schematically illustrating the memory 110 of FIG. 1.

Referring to FIG. 2, the memory 110 may include a memory cell array 210, an address decoder 220, a read and write circuit 230, a control logic 240, and a voltage generation circuit 250.

The memory cell array 210 may include a plurality of memory blocks BLK1 to BLKz, where z is a natural number of 2 or greater.

In the plurality of memory blocks BLK1 to BLKz, a plurality of word lines WL and a plurality of bit lines BL may be disposed, and a plurality of memory cells may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a single level cell (SLC) capable of storing 1-bit data. In another instance, each of the plurality of memory cells included in the memory cell array 210 may be a multi-level cell (MLC) capable of storing 2-bit data. In still another instance, each of the plurality of memory cells included in the memory cell array 210 may be a triple level cell (TLC) capable of storing 3-bit data. In yet another instance, each of the plurality of memory cells included in the memory cell array 210 may be a quad level cell (QLC) capable of storing 4-bit data. In a further instance, the memory cell array 210 may include a plurality of memory cells, each of which is capable of storing 5 or more bit data.

The number of bits of data stored in each of the plurality of memory cells may be dynamically determined. For example, a single-level cell capable of storing 1-bit data may be changed to a triple-level cell capable of storing 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may operate under the control of the control logic 240.

The address decoder 220 may receive an address through an input/output buffer in the memory 110. The address decoder 220 may decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may decode a column address in the received address. The address decoder 220 may transmit the decoded column address to the read and write circuit 230.

A read operation and a program operation of the memory 110 may be performed by the unit of a page. An address received when a read operation or a program operation is requested may include at least one of a block address, a row address and a column address.

The address decoder 220 may select one memory block and one word line depending on a block address and a row address. A column address may be decoded by the address decoder 220 and be provided to the read and write circuit 230.

The address decoder 220 may include at least one of a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. In an embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may include a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell (MC) may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
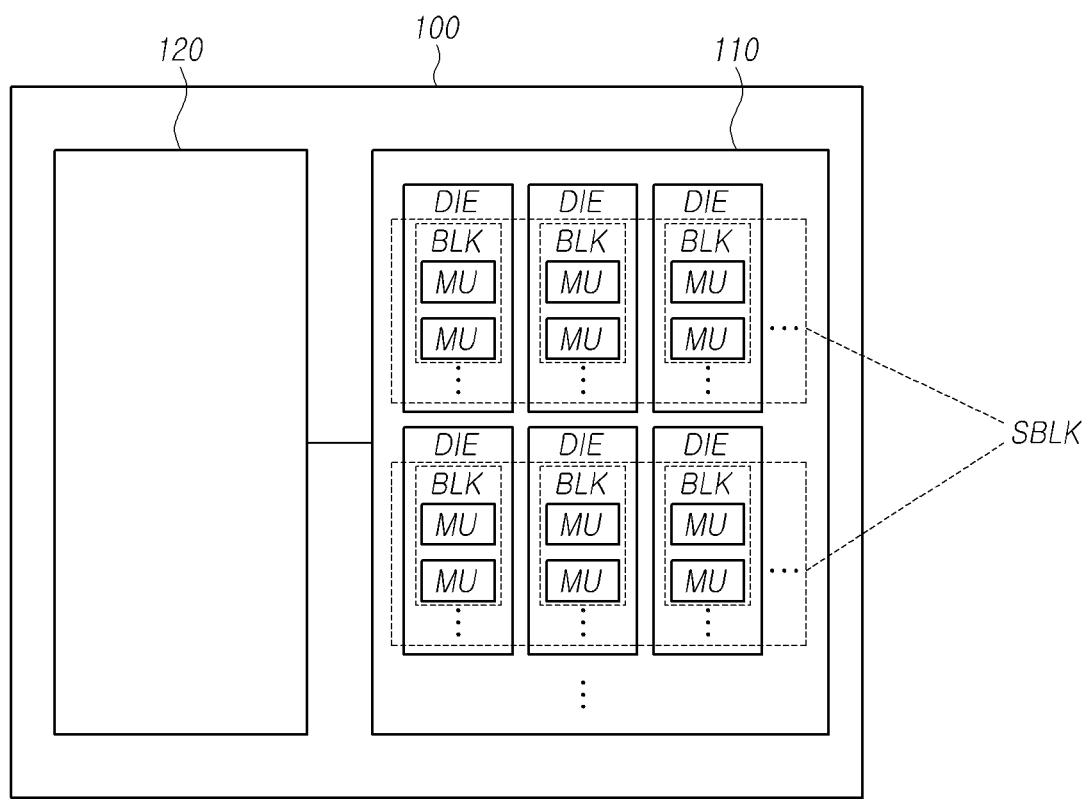
FIG. 3 is a diagram illustrating a schematic structure of a storage device according to an embodiment of the present disclosure.

FIG. 3 illustrates a schematic structure of the storage device 100 according to an embodiment of the present disclosure.

Referring to FIG. 3, the storage device 100 may include the memory 110 and the controller 120.

The memory 110 may include a plurality of memory units MU.

Each of the plurality of memory units MU may store data of a predetermined size. For example, each memory unit may include one or more memory blocks or one or more pages.

In addition, the memory 110 may include a plurality of memory blocks BLK. Each of the plurality of memory blocks BLK may include one or more of the plurality of memory units MU when each memory unit includes one or more pages.

Further, the memory 110 may include a plurality of memory dies DIE. Each of the plurality of memory dies DIE may include one or more of the plurality of memory blocks BLK.

The controller 120 may set a plurality of super memory blocks SBLK. Each of the plurality of super memory blocks SBLK may include one or more of the plurality of memory blocks BLK. In this case, memory blocks included in one super memory block may be distributed and disposed on a plurality of memory dies DIE.

In FIG. 3, memory blocks BLK included in the same super memory block SBLK are disposed on different memory dies DIE. However, the arrangement of the memory blocks BLK described in the embodiments of the present disclosure is not limited thereto. For example, some of the memory blocks BLK included in the same super memory block SBLK may be disposed on the same memory die DIE.

In addition, in FIG. 3, one memory block BLK is disposed on one memory die DIE. However, the arrangement of the memory blocks BLK described in the embodiments is not limited thereto. For example, the memory units MU included in one super memory block SBLK may be disposed on different memory dies DIE.

In this case, each of the plurality of memory units MU may be included in one of the plurality of memory dies DIE. Accordingly, each of the plurality of super memory blocks SBLK may correspond to one or more memory dies. In addition, a memory die corresponding to a specific super memory block may include one or more of memory units included in the corresponding super memory block.

There has been described a case in which each super memory block SBLK corresponds to different memory dies as an example in FIG. 3, however, different super memory blocks may correspond to the same memory die. In this case, some of the memory units included in one memory die may be included in one super memory block and some may be included in another super memory block.

The controller 120 may execute an operation of migrating data from a first super memory block among the plurality of super memory blocks SBLK to a second super memory block among the plurality of super memory blocks SBLK. Hereinafter, this will be described in detail in FIG. 4.

Figure 4:
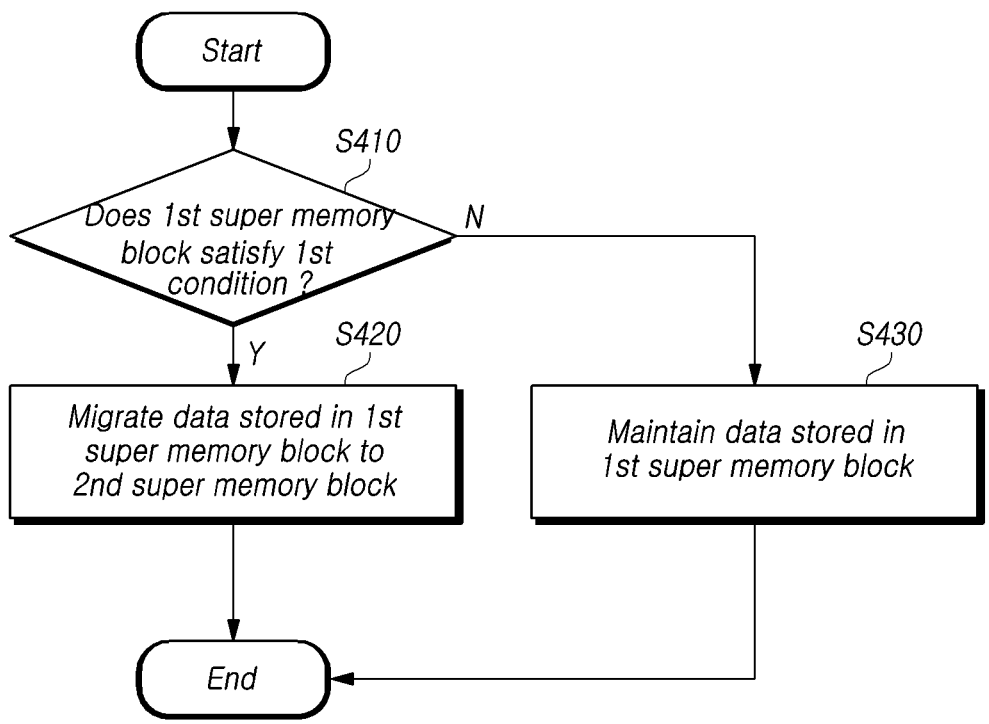
FIG. 4 is a flowchart illustrating an operation in which a storage device determines whether to migrate data from a first super memory block to a second super memory block according to an embodiment of the present disclosure.

FIG. 4 is a flowchart illustrating an operation in which the storage device 100 according to an embodiment of the present disclosure determines whether to migrate data from a first super memory block to a second super memory block.

Referring to FIG. 4, the controller 120 of the storage device 100 may determine whether a first super memory block satisfies a preset first condition (S410).

If the first super memory block satisfies the first condition (S410-Y), the controller 120 may migrate data from the first super memory block to the second super memory block based on priorities of memory units included in the first super memory block (S420).

The valid data stored in the memory units included in the first super memory block SBLK_1 may be migrated according to the migration order, and the migration order may be determined according to the priorities of memory units included in the first super memory block SBLK_1. That is, the priorities of the memory units included in the first super memory block SBLK_1 are the priorities for determining the migration order. In this case, the priorities of memory units included in the first super memory block SBLK_1 may be dynamically changed.

Hereinafter, an operation will be described in which the controller 120 migrates data from the first super memory block to the second super memory block with reference to FIG. 5.

If the first super memory block does not satisfy the first condition (S410-N), the controller 120 may maintain the data stored in the first super memory block instead of migrating the data from the first super memory block to the second super memory block (S430).

Figure 5:
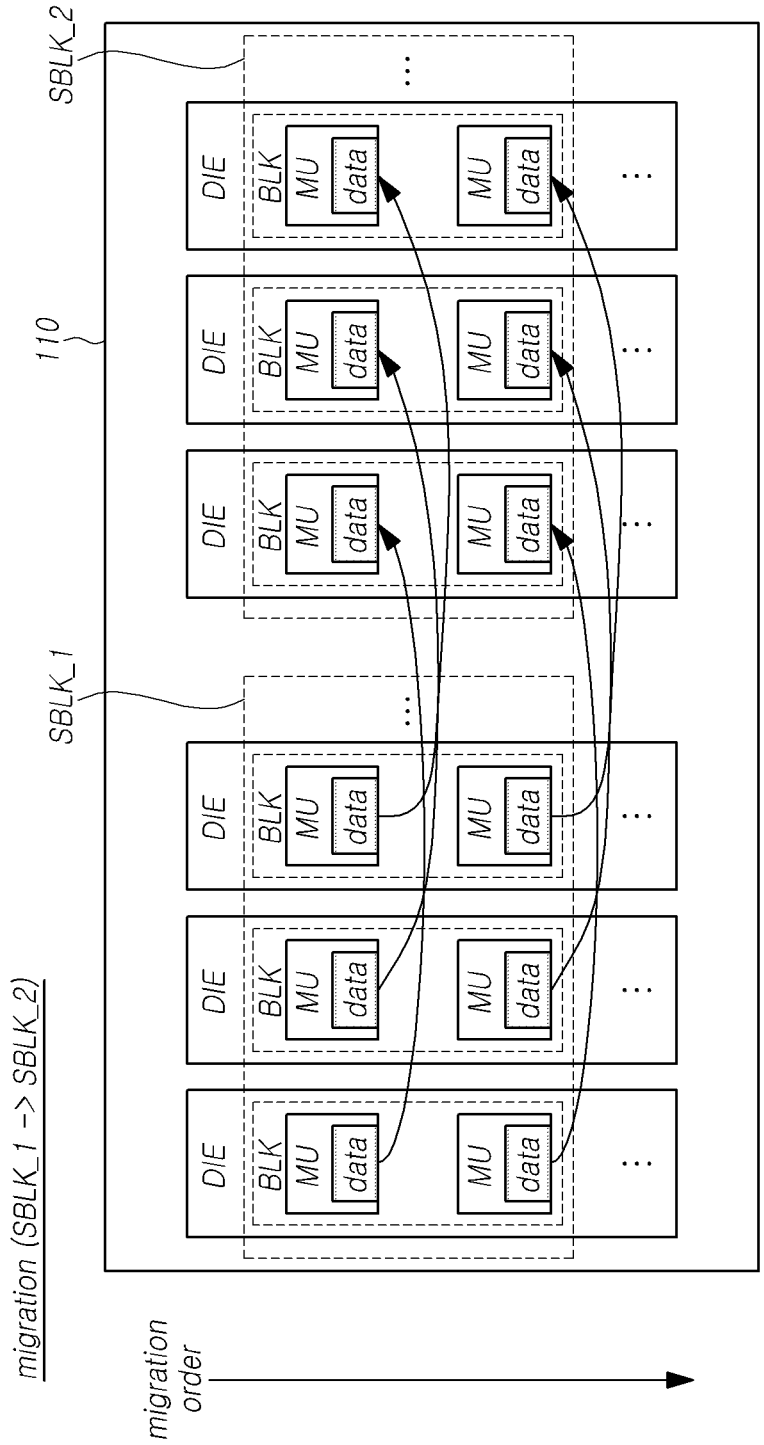
FIG. 5 is a diagram illustrating an example of an operation of migrating data from a first super memory block to a second super memory block by a storage device according to an embodiment of the present disclosure.

FIG. 5 illustrates an example of an operation of migrating data from a first super memory block SBLK_1 to a second super memory block SBLK_2 by the storage device 100 according to an embodiment of the present disclosure.

Referring to FIG. 5, the controller 120 of the storage device 100 may migrate valid data from memory units included in the first super memory block SBLK_1 to memory units included in the second super memory block SBLK_2.

In embodiments of the present disclosure, the valid data stored in a memory unit having a higher priority among the memory units included in the first super memory block SBLK_1 may be migrated to the second super memory block SBLK_2 prior to valid data stored in a memory unit having a lower priority.

In the above, an operation has been described in which the storage device 100 migrates valid data from the first super memory block SBLK_1 to the second super memory block SBLK_2.

Hereinafter, an operation will be described of the storage device 100 determining whether the first condition is satisfied to execute the migration operation described above.

Figure 6:
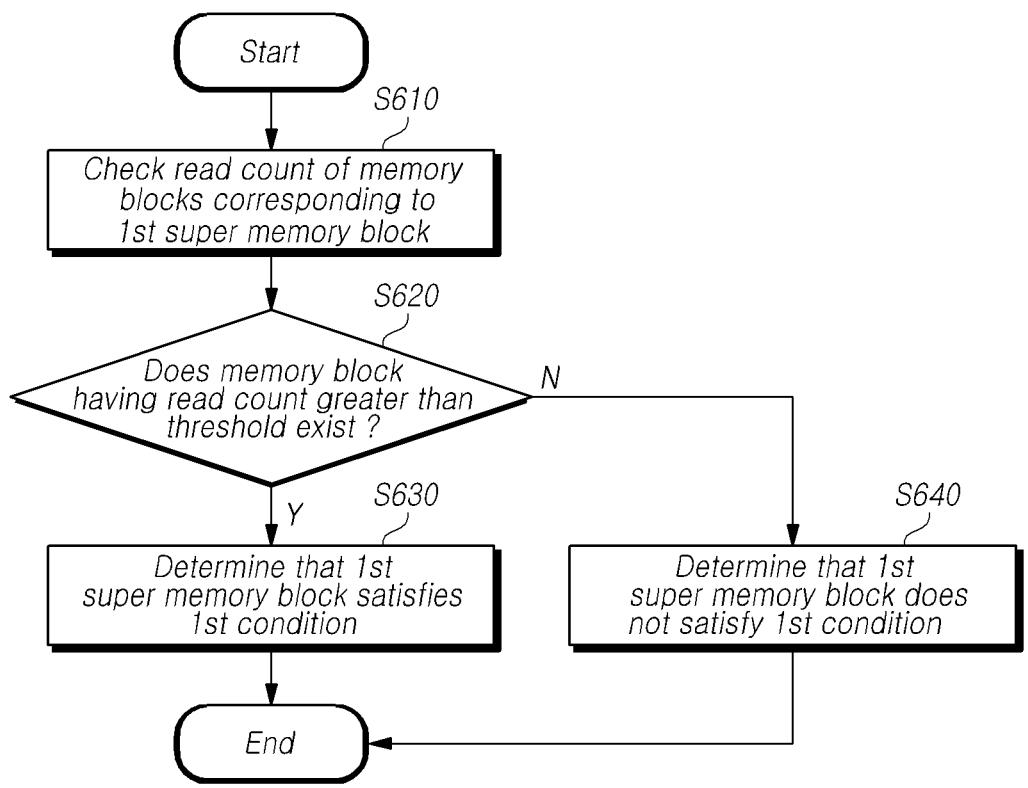
FIG. 6 is a flowchart illustrating an operation of determining whether a first super memory block satisfies a first condition by a storage device according to an embodiment of the present disclosure.

FIG. 6 is a flowchart illustrating an operation of determining whether a first super memory block SBLK_1 satisfies a first condition by the storage device 100 according to an embodiment of the present disclosure.

Referring to FIG. 6, the controller 120 of the storage device 100 may check a read count of memory blocks corresponding to the first super memory block SBLK_1 (S610).

For example, the read count of the memory block corresponding to the first super memory block SBLK_1 may mean the number of times a read operation for the corresponding memory block has been executed after a reference time point. As another example, the read count of the memory block corresponding to the first super memory block SBLK_1 may mean the number of times a read operation has been executed for a part included in the first super memory block SBLK_1 in the corresponding memory block after the reference time point.

The controller 120 may determine whether a memory block having a read count greater than or equal to a first threshold value exists among memory blocks corresponding to the first super memory block SBLK_1 (S620). Hereinafter, this will be described in detail in FIG. 7.

If a memory block having a read count equal to or greater than the first threshold value exists (S620-Y), the controller 120 may determine that the first super memory block SBLK_1 satisfies the first condition (S630).

Meanwhile, if there is no memory block having a read count equal to or greater than the first threshold value (S620-N), the controller 120 may determine that the first super memory block SBLK_1 does not satisfy the first condition (S640).

Figure 7:
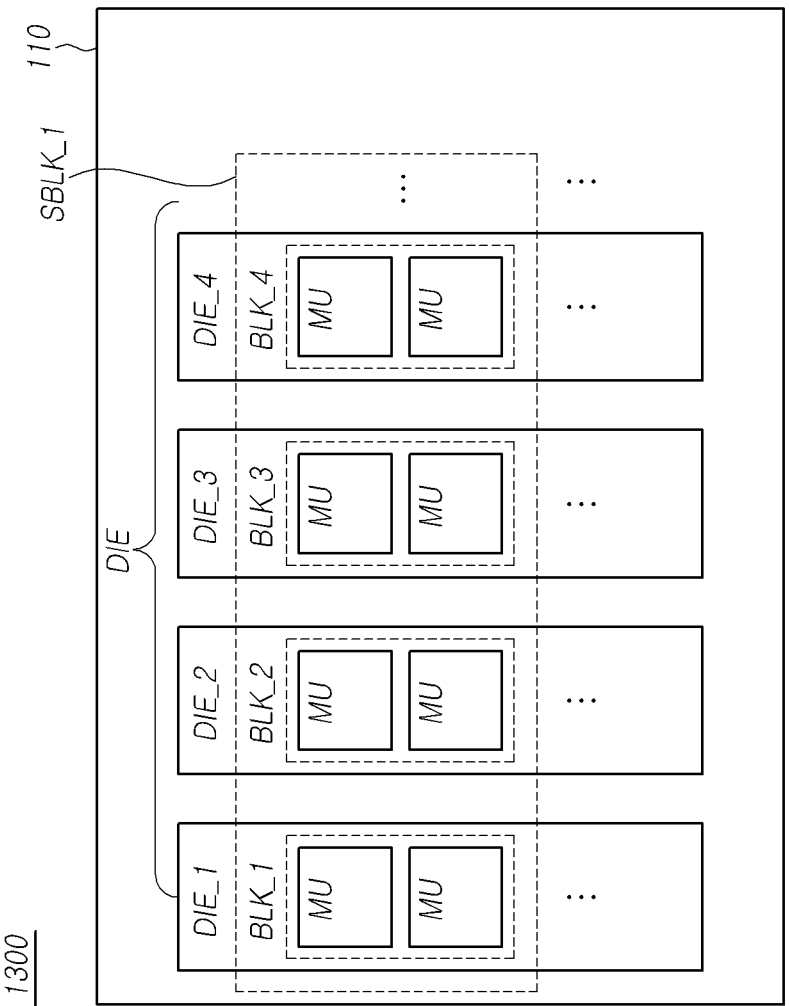
FIG. 7 is a diagram illustrating an example of an operation of determining whether a first super memory block satisfies a first condition by a storage device according to an embodiment of the present disclosure.

FIG. 7 illustrates an example of an operation of determining whether a first super memory block SBLK_1 satisfies a first condition by the storage device 100 according to an embodiment of the present disclosure.

Referring to FIG. 7, the first super memory block SBLK_1 may include a first memory block BLK_1, a second memory block BLK_2, a third memory block BLK_3, and a fourth memory block BLK_4. In addition, the first memory block BLK_1, the second memory block BLK_2, the third memory block BLK_3 and the fourth memory block BLK_4 may correspond to a first memory die DIE_1, a second memory die DIE_2, a third memory die DIE_3 and a fourth memory die DIE_4 among a plurality of memory dies DIE included in the memory 110, respectively. However, the number of memory blocks corresponding to the first super memory block SBLK_1 is not limited to the embodiment of FIG. 7.

In FIG. 7, a read count of the first memory block BLK_1 is 1100, a read count of the second memory block BLK_2 is 1200, a read count of the third memory block BLK_3 is 1300, and a read count of the fourth memory block BLK_4 is 1100. In addition, the first threshold value THR_1 is 1300.

In this case, since the read count of the third memory block BLK_3 is greater than or equal to the first threshold value THR_1, the controller 120 of the storage device 100 may determine that the first super memory block SBLK_1 satisfies the first condition.

In the above, it has been described that the controller 120 of the storage device 100 determines whether the first super memory block SBLK_1 satisfies the first condition, and if the first super memory block SBLK_1 satisfies the first condition, migrates valid data from the first super memory block SBLK_1 to the second super memory block SBLK_2 based on the priorities of memory units included in the first super memory block SBLK_1.

Meanwhile, if a target memory unit among the memory units included in the first super memory block SBLK_1 satisfies a second condition during the operation of migrating valid data from the first super memory block SBLK_1 to the second super memory block SBLK_2, the controller 120 of the storage device 100 may increase a priority of the target memory unit. Hereinafter, this will be described in detail in FIG. 8.

Figure 8:
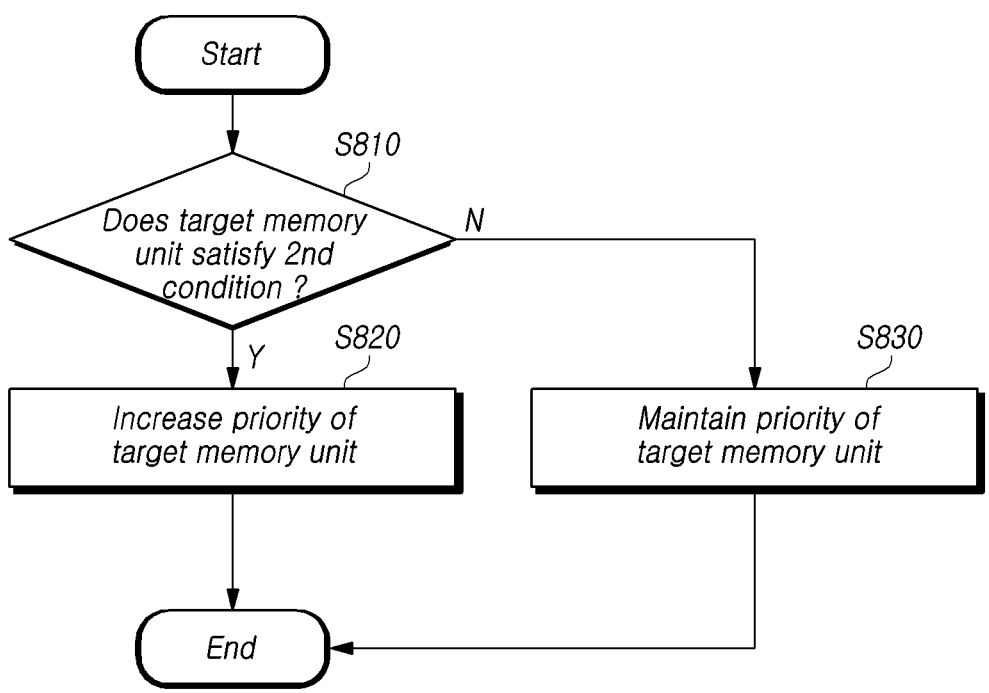
FIG. 8 is a flowchart illustrating an operation in which a storage device determines whether to increase a priority of a target memory unit according to an embodiment of the present disclosure.

FIG. 8 is a flowchart illustrating an operation in which the storage device 100 determines whether to increase a priority of a target memory unit according to an embodiment of the present disclosure.

Referring to FIG. 8, the controller 120 of the storage device 100 may determine whether the target memory unit satisfies the second condition (S810). This will be described in detail in FIG. 10 below.

If the target memory unit satisfies the second condition (S810-Y), the controller 120 may increase the priority of the target memory unit (S820). In this case, valid data stored in the target memory unit may be more rapidly migrated to the second super memory block SBLK_2.

Meanwhile, if the target memory unit does not satisfy the second condition (S810-N), the controller 120 may maintain the priority of the target memory unit (S830).

Figure 9:
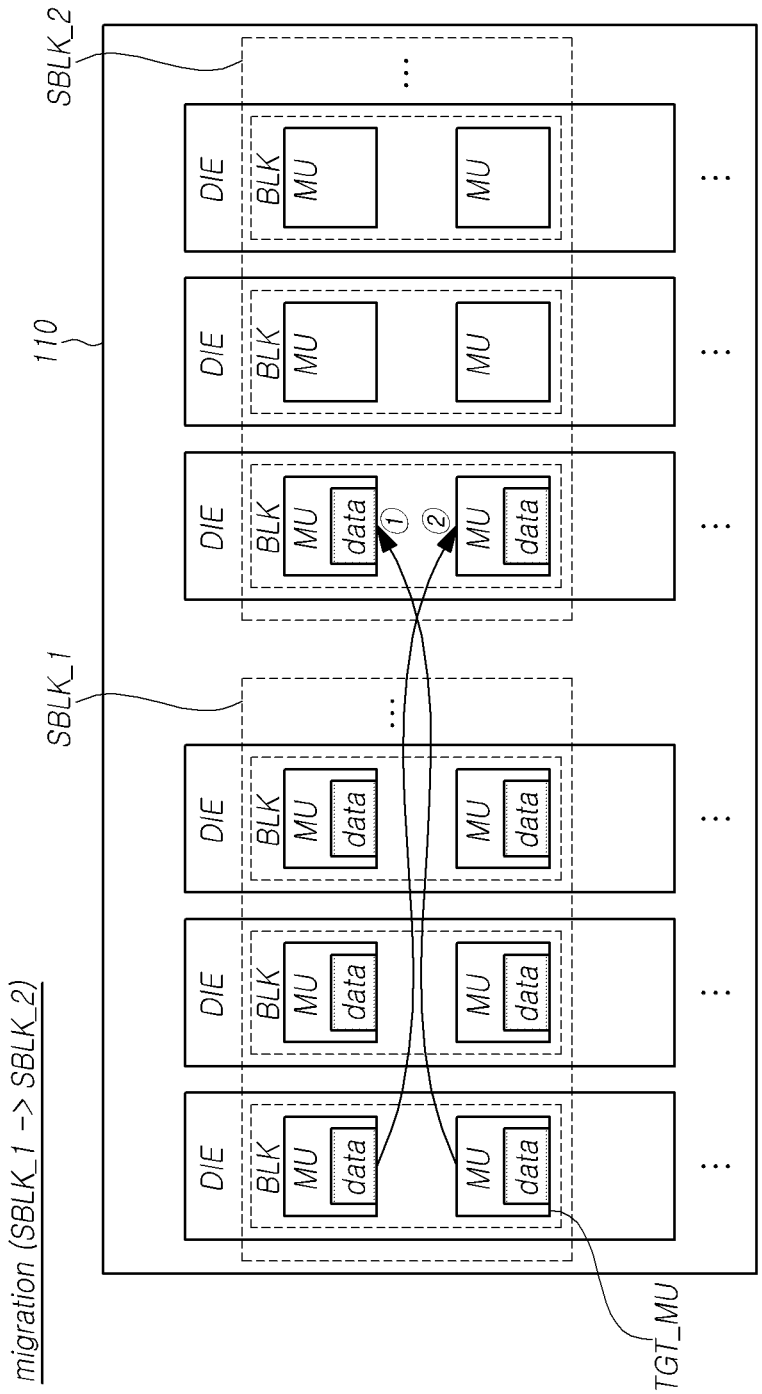
FIG. 9 is a diagram illustrating another example of an operation of migrating data from a first super memory block to a second super memory block by a storage device according to an embodiment of the present disclosure.

FIG. 9 illustrates another example of an operation of migrating data from a first super memory block SBLK_1 to a second super memory block SBLK_2 by the storage device 100 according to an embodiment of the present disclosure.

Referring to FIG. 9, the controller 120 of the storage device 100 may first migrate, to the second super memory block SBLK_2, valid data from a target memory unit TGT_MU among the memory units included in the first super memory block SBLK_1 (①). This is because the priority of the target memory unit TGT_MU is increased as the target memory unit TGT_MU satisfies the second condition.

After migrating valid data from the target memory unit TGT_MU to the second super memory block SBLK_2, the controller 120 may migrate valid data from other memory unit among memory units included in the first super memory block SBLK_1 to the second super memory block SBLK_2 (②).

Figure 10:
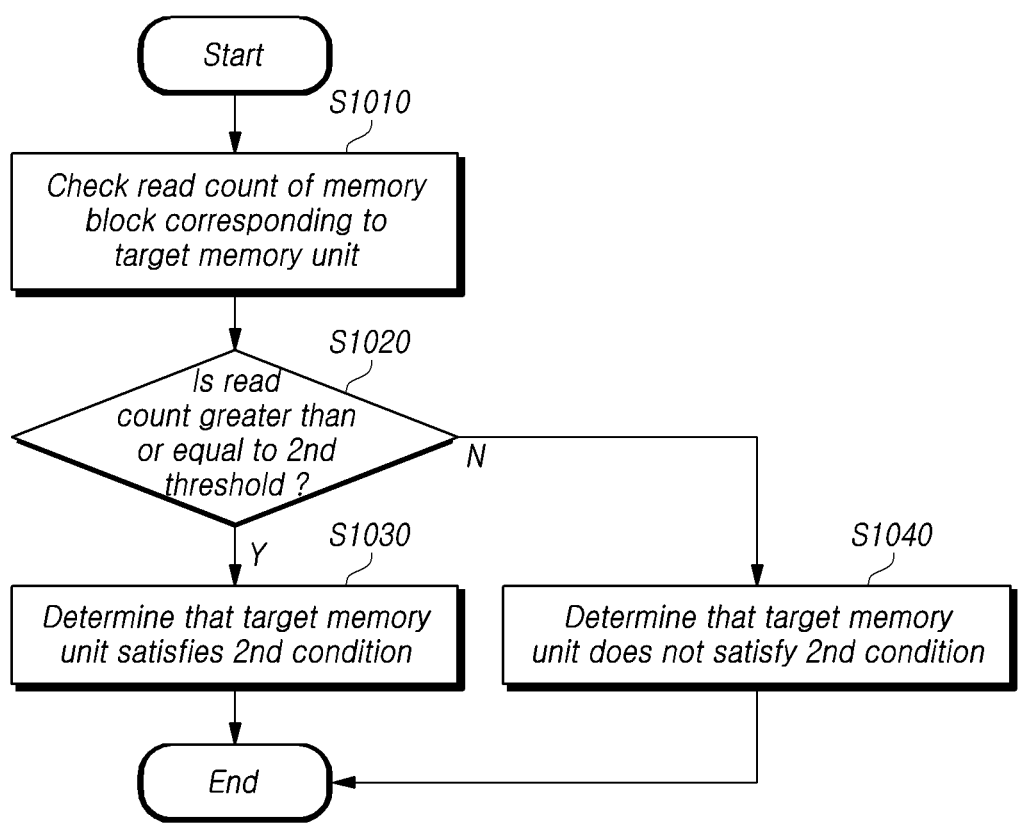
FIG. 10 is a flowchart illustrating an example of an operation of determining whether a target memory unit satisfies a second condition in a storage device according to an embodiment of the present disclosure.

FIG. 10 is a flowchart illustrating an example of an operation of determining whether a target memory unit TGT_MU satisfies a second condition in the storage device 100 according to an embodiment of the present disclosure.

Referring to FIG. 10, the controller 120 of the storage device 100 may check a read count of a memory block corresponding to the target memory unit TGT_MU (S1010).

In addition, the controller 120 may determine whether the read count of the memory block corresponding to the target memory unit TGT_MU is greater than or equal to a preset second threshold value (S1020). In this case, the second threshold value is greater than the first threshold value.

If the read count is greater than or equal to the second threshold value (S1020-Y), the controller 120 may determine that the target memory unit TGT_MU satisfies the second condition (S1030).

If the read count is less than the second threshold value (S1020-N), the controller 120 may determine that the target memory unit TGT_MU does not satisfy the second condition (S1040).

Figure 11:
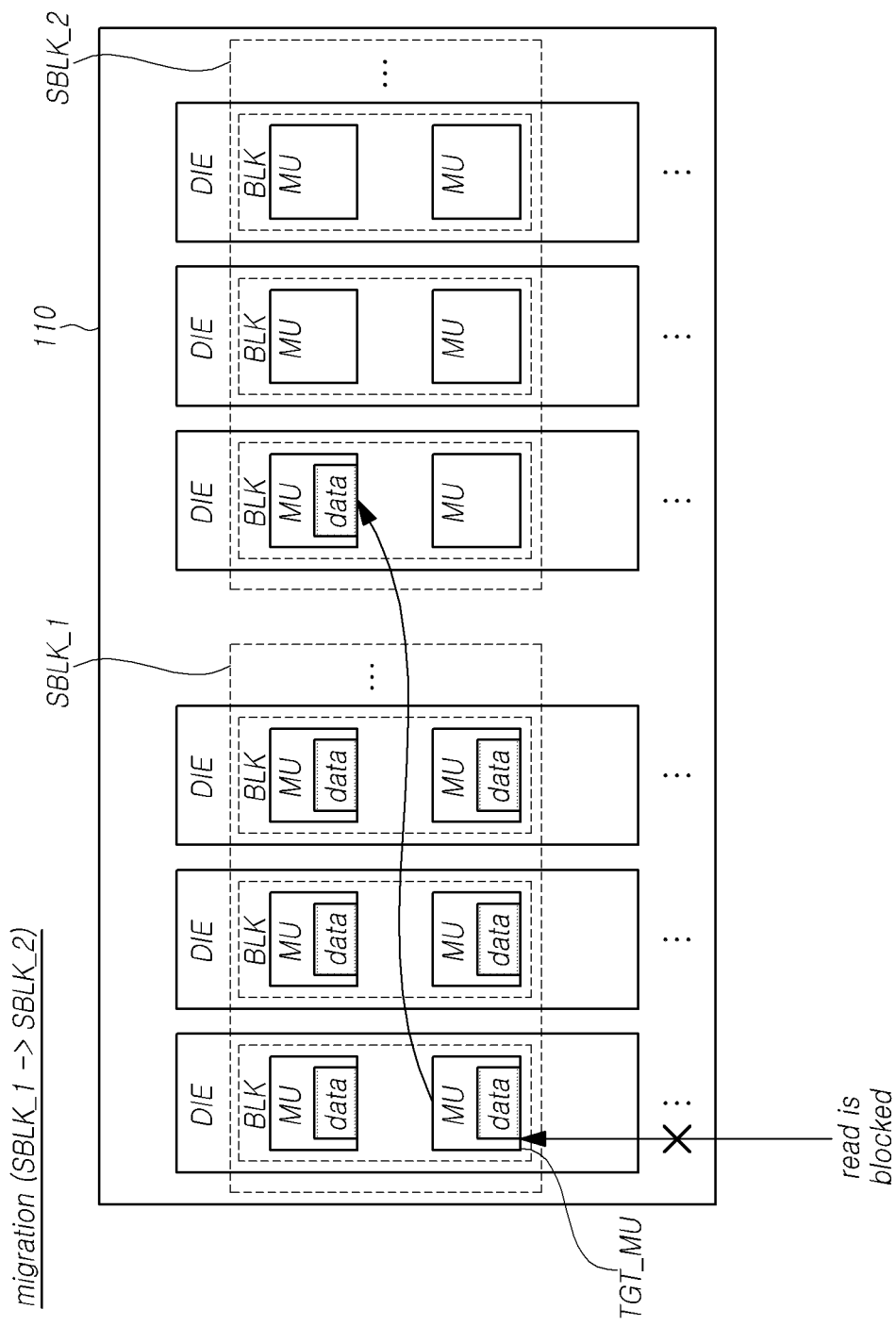
FIG. 11 is a diagram illustrating an operation of blocking a read operation of a target memory unit by a storage device according to an embodiment of the present disclosure.

FIG. 11 illustrates an operation of blocking a read operation of a target memory unit TGT_MU by the storage device 100 according to an embodiment of the present disclosure.

Referring to FIG. 11, valid data stored in the target memory unit TGT_MU may be migrated to the second super memory block SBLK_2.

In this case, if the target memory unit TGT_MU satisfies the second condition, the controller 120 may block a read operation on the target memory unit TGT_MU until valid data stored in the target memory unit TGT_MU is completely migrated to the second super memory block SBLK_2. Blocking the read operation on the target memory unit TGT_MU may mean stopping the read operation on the target memory unit TGT_MU without executing the read operation.

This is to prevent a read disturb from occurring when executing a read operation on the target memory unit TGT_MU. In embodiments of the present disclosure, the case that the target memory unit TGT_MU satisfies the second condition may mean that the read disturb is highly likely to occur in the target memory unit TGT_MU so that the valid data stored in the target memory unit TGT_MU is required to be migrated more rapidly. If an additional read operation is executed on the target memory unit TGT_MU in this case, there may occur a read disturb in the target memory unit TGT_MU.

However, as the blocking time of the read operation for the target memory unit TGT_MU increases, the possibility of occurrence of a timeout for the read operation increases, which may lead to a decrease in performance of the read operation. Accordingly, the controller 120 may increase the priority of the target memory unit TGT_MU in order to minimize a time during which a read operation on the target memory unit TGT_MU is blocked.

When increasing the priority of the target memory unit TGT_MU, the controller 120 of the storage device 100 may also increase the priorities of other memory units. For example, the controller 120 may also increase the priorities of memory units corresponding to the same word line as the target memory unit TGT_MU among memory units included in the first super memory block SBLK_1. Hereinafter, this will be described in detail in FIG. 12.

Figure 12:
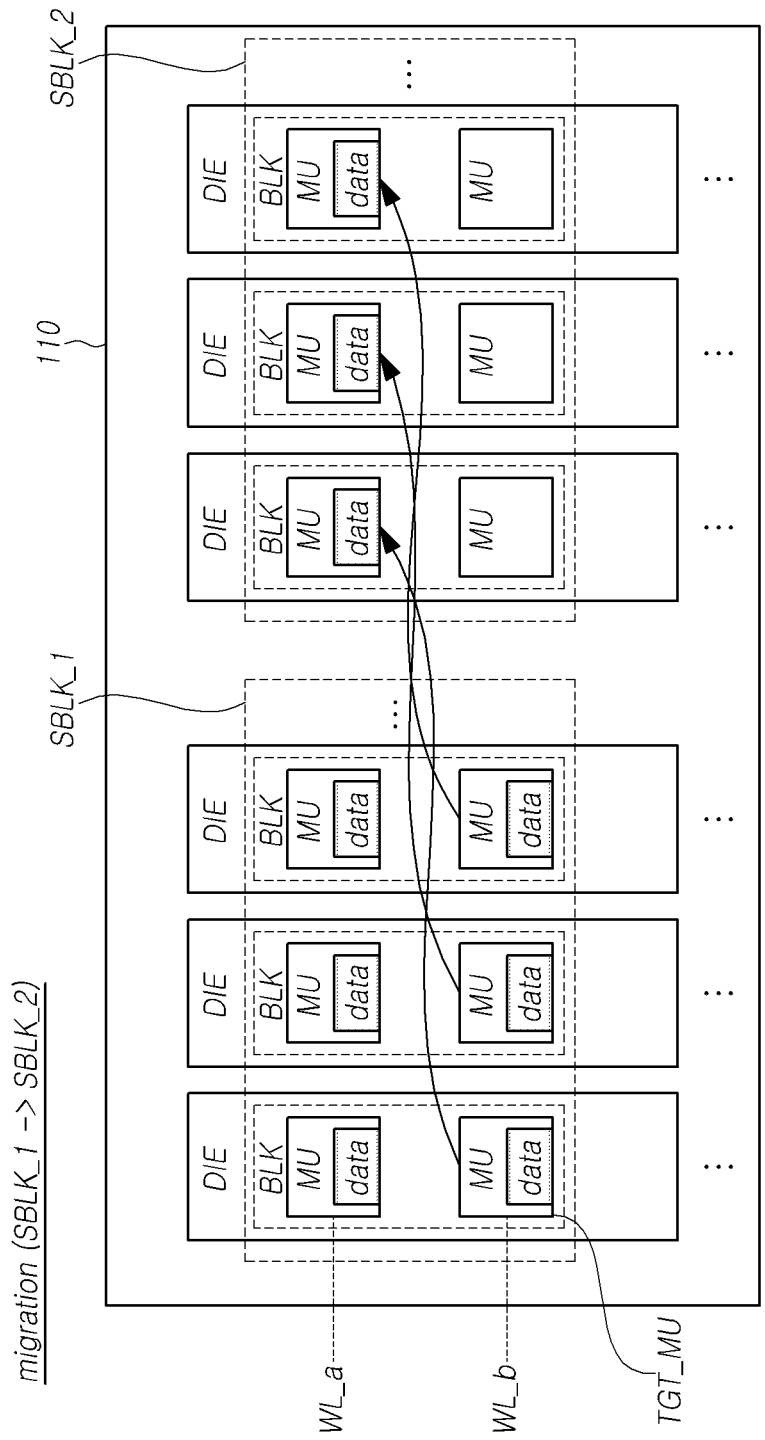
FIG. 12 is a diagram illustrating another example of an operation of migrating data from a first super memory block to a second super memory block by a storage device according to an embodiment of the present disclosure.

FIG. 12 illustrates another example of an operation of migrating data from a first super memory block SBLK_1 to a second super memory block SBLK_2 by the storage device 100 according to an embodiment of the present disclosure.

Referring to FIG. 12, the controller 120 of the storage device 100 may also increase the priorities of other memory units corresponding to a word line WL_b corresponding to the target memory unit TGT_MU among memory units included in the first super memory block SBLK_1.

In this case, priorities of memory units corresponding to the word line WL_b may be equally increased. That is, the controller 120 may determine the priorities of the memory units corresponding to the word line WL_b so that the memory units corresponding to the word line WL_b are migrated to the second super memory block SBLK_2 together.

In FIG. 12, since the priorities of memory units corresponding to the word line WL_b are increased, valid data stored in the memory units corresponding to the word line WL_b may be migrated to the second super memory block SBLK_2 prior to valid data stored in memory units corresponding to other word lines WL_a.

Accordingly, the priorities of other memory units corresponding to the word line WL_b corresponding to the target memory unit TGT_MU are simultaneously increased, thereby preventing degradation of sequential read performance due to the migration operation.

In the case that the sequential read performance is executed, memory units corresponding to the same word line may be simultaneously read through an interleaving scheme. To this end, data stored in memory units corresponding to the same word line is required to be stored in a specific order. If only data stored in the target memory unit TGT_MU is migrated first, the order of data stored in the target memory unit TGT_MU and data stored in other memory units corresponding to the word line WL_b corresponding to the target memory unit TGT_MU may be changed after the migration operation. In this case, it may be impossible to execute the sequential read performance through the interleaving scheme, so that the sequential read performance may be degraded. Therefore, in order to solve this issue, priorities of other memory units corresponding to the word line WL_b corresponding to the target memory unit TGT_MU may be simultaneously increased.

The controller 120 of the storage device 100 may utilize a priority queue to increase the priority of the target memory unit TGT_MU. The priority queue may queue information of a memory unit to be migrated first to a second super memory block SBLK_2 among memory units included in the first super memory block SBLK_1.

Hereinafter, this will be described in detail in FIG. 13.

Figure 13:
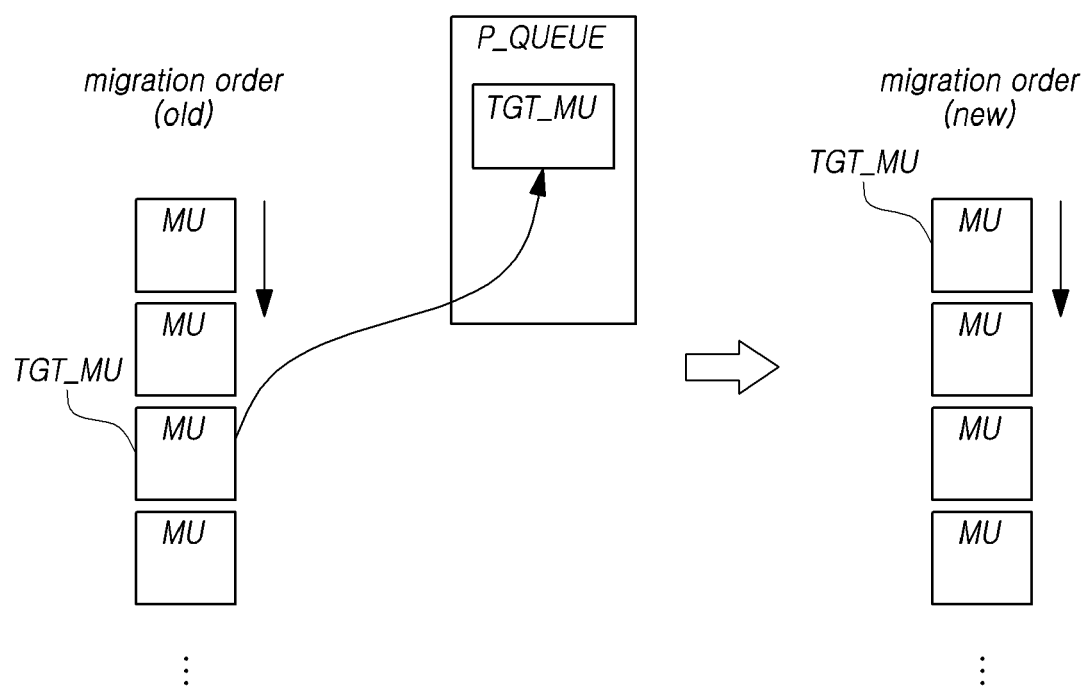
FIG. 13 is a diagram illustrating an operation of managing a priority queue by a storage device according to an embodiment of the present disclosure.

FIG. 13 illustrates an operation of managing a priority queue P_QUEUE by the storage device 100 according to an embodiment of the present disclosure.

Referring to FIG. 13, the controller 120 of the storage device 100 may enqueue information about the target memory unit TGT_MU in a priority queue P_QUEUE. In this case, the target memory unit TGT_MU may be migrated prior to other memory units.

The controller 120 may increase the priority of the target memory unit TGT_MU by enqueuing information about the target memory unit TGT_MU into the priority queue P_QUEUE.

Figure 14:
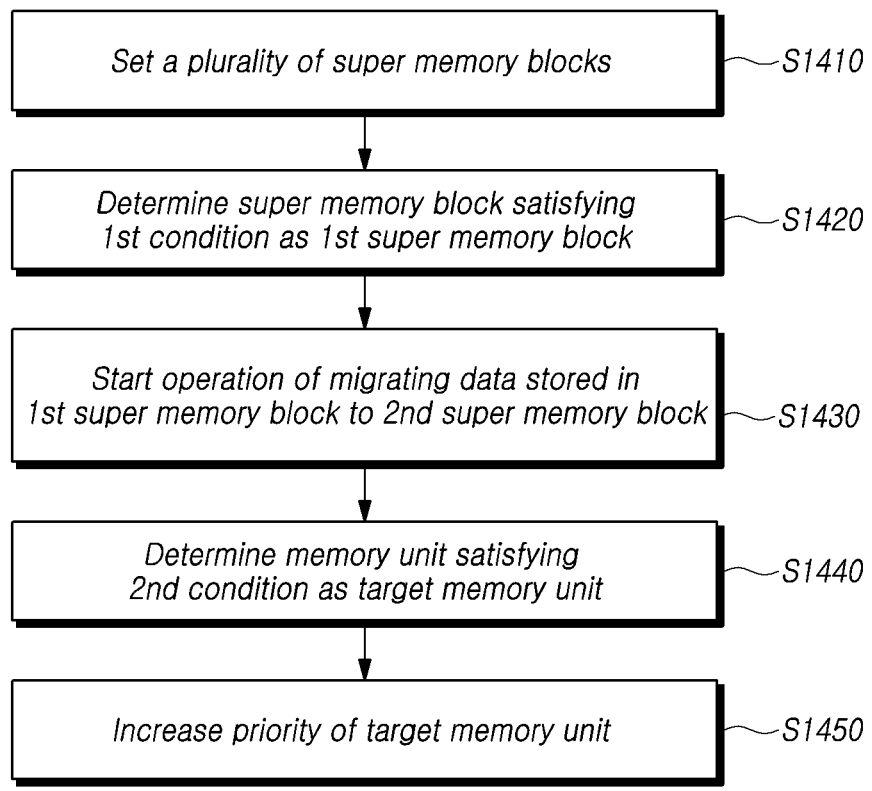
FIG. 14 is a flowchart illustrating an operating method of a storage device according to an embodiment of the present disclosure.

FIG. 14 is a flowchart illustrating an operating method of the storage device 100 according to an embodiment of the present disclosure.

Referring to FIG. 14, the operating method of the storage device 100 may include setting a plurality of super memory blocks SBLK (S1410). In this case, each of the plurality of super memory blocks SBLK may include one or more of the plurality of memory blocks BLK. In addition, each of the plurality of memory blocks BLK may include one or more of the plurality of memory units MU.

In addition, the operating method of the storage device 100 may include determining, as a first super memory block SBLK_1, a super memory block satisfying a first condition among a plurality of set super memory blocks SBLK (S1420).

For example, in operation S1420, the storage device 100 may determine the first super memory block SBLK_1 as satisfying the first condition if the first super memory block SBLK_1 includes a memory block having a read count equal to or greater than a set first threshold value.

In addition, the operating method of the storage device 100 may include starting an operation of migrating data from the first super memory block SBLK_1 to a second super memory block SBLK_2 among the plurality of super memory blocks SBLK based on priorities of the memory units included in the first super memory block SBLK_1 (S1430).

In addition, the operating method of the storage device 100 may include determining, as a target memory unit TGT_MU, a memory unit satisfying, after the starting, a second condition among the memory units included in the first super memory block SBLK_1 (S1440).

For example, in operation S1440, the storage device 100 may determine that the target memory unit TGT_MU satisfies the second condition if a read count of a memory block including the target memory unit TGT_MU within the first super memory block SBLK_1 is greater than or equal to a specific second threshold value. In this case, the second threshold value is greater than the first threshold value.

In addition, the operating method of the storage device 100 may include increasing the priority of the target memory unit TGT_MU (S1450).

For example, in operation S1450, the priorities of memory units corresponding to the same word line as a word line corresponding to the target memory unit TGT_MU among the memory units included in the first super memory block SBLK_1 may be increased together. In this case, the priorities of memory units corresponding to the same word line as the word line corresponding to the target memory unit TGT_MU among the memory units included in the first super memory block SBLK_1 may be equally increased.

For example, in operation S1450, information about the target memory unit TGT_MU may be enqueued in a priority queue P_QUEUE for queuing information of a memory unit to be migrated with a high priority to the second super memory block SBLK_2 among the memory units included in the first super memory block SBLK_1.

Although embodiments of the present disclosure have been described for illustrative purposes, those skilled in the art will appreciate that various modifications, additions and substitutions are possible, without departing from the scope and spirit of this disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims. Furthermore, the embodiments may be combined to form additional embodiments.

What is claimed is:

1. A storage device comprising:
a memory including a plurality of memory blocks each including one or more memory units; and
a controller configured to:
set a plurality of super memory blocks each including one or more of the plurality of memory blocks,
execute, when a first super memory block among the plurality of super memory blocks satisfies a first condition, an operation of migrating data from the first super memory block to a second super memory block among the super memory blocks based on priorities of the memory units included in the first super memory block, and
increase the priority of a target memory unit among the memory units included in the first super memory block when the target memory unit satisfies a second condition during the operation of migrating,
wherein the controller is further configured to determine that the first super memory block satisfies the first condition for migrating the data from the first super memory block to the second super memory block when the first super memory block includes a memory block having a read count equal to or greater than a first threshold value,
wherein the controller is further configured to determine that the target memory unit satisfies the second condition for increasing the priority of the target memory unit, when the first super memory block includes a memory block including the target memory unit and has a read count greater than or equal to a second threshold value which is greater than the first threshold value, and
wherein the controller is further configured to increase, among the memory units included in the first super memory block, the priorities of memory units corresponding to the same word line as the target memory unit.

2. The storage device of claim 1, wherein the controller is further configured to block, when the target memory unit satisfies the second condition, a read operation on the target memory unit until the data is migrated from the target memory unit to the second super memory block.

3. The storage device of claim 1, wherein the controller increases the priorities of the memory units corresponding to the same word line as the target memory unit so that the target memory unit and the memory units corresponding to the same word line as the target memory unit have the same priority.

4. The storage device of claim 1,
further comprising a priority queue for queuing information of a memory unit having the highest priority of the priorities of the memory units included in the first super memory block, and
wherein the controller increases the priority of the target memory unit by enqueueing information about the target memory unit in the priority queue.

5. An operating method of a storage device comprising:
setting a plurality of super memory blocks each including one or more of a plurality of memory blocks each including one or more memory units;
determining, as a first super memory block, a super memory block satisfying a first condition among the plurality of super memory blocks;
starting an operation of migrating data from the first super memory block to a second super memory block among the plurality of super memory blocks based on priorities of the memory units included in the first super memory block;
determining, as a target memory unit, a memory unit satisfying, after the starting, a second condition among the memory units included in the first super memory block; and
increasing the priority of the target memory unit,
wherein the first condition for migrating the data from the first super memory block to the second super memory block is a condition in which a memory block has a read count greater than or equal to a first threshold value within a super memory block,
wherein the second condition for increasing the priority of the target memory unit is a condition in which a read count of a memory block including the target memory unit within the first super memory block is greater than or equal to a second threshold value which is greater than the first threshold value, and
wherein the operating method further comprising increasing, among the memory units included in the first super memory block, the priorities of memory units corresponding to the same word line as the target memory unit.

6. The operating method of claim 5, wherein the priorities of the memory units corresponding to the same word line as the target memory unit are increased so that the target memory unit and the memory units corresponding to the same word line as the target memory unit have the same priority.

7. The operating method of claim 5, wherein the increasing the priority of the target memory unit comprises enqueuing information about the target memory unit in a priority queue for queuing information of a memory unit having the highest priority of the priorities of the memory units included in the first super memory block.

8. A storage device comprising:
a memory including one or more memory dies each including a plurality of memory blocks; and
a controller configured to:
set a plurality of super memory blocks each including one or more of the plurality of memory blocks,
execute, when a first super memory block among the plurality of super memory blocks satisfies a first condition, an operation of migrating data from the first super memory block to a second super memory block among the super memory blocks based on priorities of one or more memory units included in the first super memory block, and
increase the priority of a target memory unit among the memory units included in the first super memory block when the target memory unit satisfies a second condition during the operation of migrating,
wherein the memory blocks included in the first super memory blocks are distributed over the memory dies,
wherein the controller is further configured to determine that the first super memory block satisfies the first condition for migrating the data from the first super memory block to the second super memory block when the first super memory block includes a memory block having a read count equal to or greater than a first threshold value, wherein the controller is further configured to determine that the target memory unit satisfies the second condition for increasing the priority of the target memory unit when the first super memory block includes a memory block including the target memory unit and has a read count greater than or equal to a second threshold value which is greater than the first threshold value, and wherein the controller is further configured to increase, among the memory units included in the first super memory block, the priorities of memory units corresponding to the same word line as the target memory unit.

* * * * *